(12) United States Patent
Asahi

(10) Patent No.: US 6,815,599 B2
(45) Date of Patent: Nov. 9, 2004

(54) MUSICAL INSTRUMENT

(75) Inventor: Yasuhiko Asahi, Iwata (JP)

(73) Assignee: Yamaha Corporation (JP)

( * ) Notice: Subject to any disclaimer, the term of this patent is extended or adjusted under 35 U.S.C. 154(b) by 31 days.

(21) Appl. No.: 10/431,216

(22) Filed: May 7, 2003

(65) Prior Publication Data

US 2003/0209131 A1 Nov. 13, 2003

(30) Foreign Application Priority Data

May 8, 2002 (JP) .................................... 2002-133328

(51) Int. Cl.[7] .............................................. G09B 15/00
(52) U.S. Cl. ...................... 84/485 R; 84/464 A; 84/616
(58) Field of Search ............................ 84/485 R, 464 A, 84/616, 654

(56) References Cited

U.S. PATENT DOCUMENTS

| | | | | |
|---|---|---|---|---|
| 2,225,084 A | * | 12/1940 | Pierce | 84/477 R |
| 4,685,373 A | * | 8/1987 | Novo | 84/464 A |
| 4,703,681 A | | 11/1987 | Okamoto | 84/478 |
| 5,286,909 A | | 2/1994 | Shibukawa | 84/609 |
| 5,504,269 A | * | 4/1996 | Nagahama | 84/609 |
| 6,025,551 A | * | 2/2000 | Munekawa et al. | 84/477 R |
| 6,211,452 B1 | * | 4/2001 | Haruyama | 84/477 R |
| 6,225,544 B1 | * | 5/2001 | Sciortino | 84/464 A |

* cited by examiner

*Primary Examiner*—Jeffrey W. Donels
(74) *Attorney, Agent, or Firm*—Rossi & Associates

(57) ABSTRACT

A musical instrument has play pistons incorporated in a trumpet-shaped housing at the upper central part in the front-and-back direction. An air vibration sensor for inputting voices is provided at the end surface on the front side of housing. When a player inputs voices into air vibration sensor simultaneously with the player's operation of play pistons, a musical tone is generated having a tone pitch that is determined by a combination of the operation of play pistons and the frequency of the voice sound signal. Rings formed of transparent or translucent resin and emitting light by energization of light-emitting elements are incorporated at the foot of play pistons. Through energization of light-emitting elements in accordance with performance data, light emission of rings guides playing. Thus, the player can easily play and practice the musical instrument, such as a trumpet, that determines the tone pitch of a musical tone in accordance with a combination of operation of a plurality of play operators.

11 Claims, 6 Drawing Sheets

FIG.5

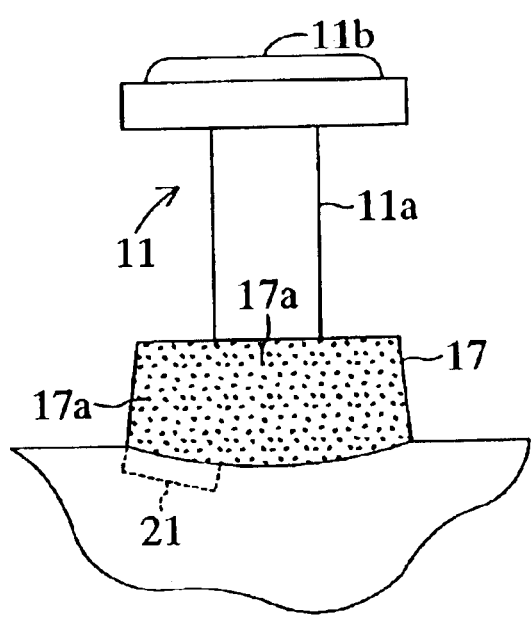 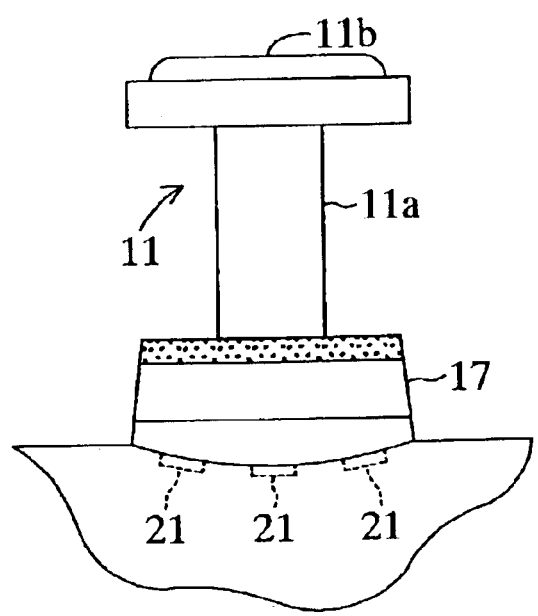

MUSICAL INSTRUMENT

BACKGROUND OF THE INVENTION

1. Field of the Invention

The present invention relates to a musical instrument having a plurality of play operators for determining a tone pitch of a generated musical tone in accordance with a combination of operation of the plurality of play operators, like a wind instrument such as a trumpet or a horn.

2. Description of the Background Art

In recent years, a musical instrument has appeared that generates a musical tone electronically by imitating a method of playing a wind instrument such as a saxophone or a recorder. This type of musical instrument includes a plurality of play operators that are pressed and operated by a player for determining a tone pitch of a generated musical tone in accordance with a pressing operation of the plurality of play operators, in the same manner as in a wind instrument such as a saxophone or a recorder.

In the aforesaid wind instrument or electronic wind instrument, designation of tone pitch for playing operation is comparatively easy. However, in a wind instrument such as a trumpet or a horn, since the tone pitch of a generated musical tone is determined by a combination of pressing operation of three piston operators, designation of tone pitch is a little more complex. Namely, one finds it difficult to perform smooth playing of such a wind instrument, as compared with a musical instrument such as a keyboard instrument in which one operator (one key) is operated for designation of tone pitch. This, therefore, raises a problem in that a player who has not mastered playing a wind instrument such as a trumpet or a horn cannot enjoy this type of musical instrument with ease, and finds it difficult to seize an opportunity for practicing to play the musical instrument.

SUMMARY OF THE INVENTION

The present invention has been made in order to solve the aforementioned problems of the prior art, and an object thereof is to make a user capable of easily enjoying playing a musical instrument that determines a tone pitch of a generated musical tone in accordance with a combination of operation of a plurality of play operators and capable of easily practicing on the musical instrument.

In order to achieve the aforementioned object, a characteristic constitutional feature of the present invention lies in that, in a musical instrument that determines a tone pitch of a generated musical tone in accordance with a combination of operation of a plurality of play operators, a play guiding device is provided for guiding a player to proceed to play by a method such that the player in a playing state can perceive, where the play guiding device shows the player a combination of the plurality of play operators that should be operated by the player.

In this case, the play guiding device can be constructed to show the player the play operators that should be operated, through, for example, light emission of the plurality of play operators themselves, light emission of a neighborhood of each of the plurality of play operators, displacement of the plurality of play operators (for example, vertical movement or vibration of the play operators), or the like.

Further, the plurality of play operators may be displaced, for example downwards, by operation of the player. The play guiding device may comprise a plurality of light emitting elements disposed in the neighborhood of the plurality of play operators respectively. In this case each of the plurality of light emitting elements may function as a stopper against each displacement (for example, each downward displacement) of the plurality of play operators. Instead of this, the musical instrument further includes a plurality of stopping members for restricting the displacement (for example, the downward displacement) of the plurality of play operators respectively. The plurality of stopping members may be disposed in the neighborhood of the plurality of light emitting elements.

Furthermore, the musical instrument may further includes a plate disposed in the neighborhood of the plurality of play operators, the plate embedding the plurality of light emitting elements. In this case, musical instrument further may include a plurality of stopping members for restricting the displacement (for example, the downward displacement) of the plurality of play operators respectively on the plate.

According to the characteristic feature of the present invention thus constructed, a combination of the plurality of play operators that should be operated can be shown to the player by a method such that the player in a playing state can perceive, through light emission of the plurality of play operators themselves, light emission of a neighborhood of each of the plurality of play operators, displacement of the plurality of play operators, or the like. Therefore, according to the characteristic feature of the present invention, even a player who has not mastered playing this type of musical instrument can easily determine the tone pitch of the generated musical tone by following the aforesaid play guide, so that the player can easily enjoy playing this type of musical instrument and can easily practice on the musical instrument.

Another characteristic feature of the present invention lies in that the musical instrument of this type is further provided with a converting portion for inputting tone pitch data representing a tone pitch and for converting the input tone pitch data into combination data representing a combination of operation of the plurality of play operators corresponding to the tone pitch represented by the tone pitch data, and a guide controlling portion for controlling the combination of operation of the play operators shown to the player by the play guiding device, in accordance with the combination data converted by the converting portion.

According to the characteristic feature of the present invention thus constructed, by simply inputting tone pitch data representing a tone pitch, the converting portion and the guide controlling portion show the player a combination of the plurality of play operators that should be operated. Therefore, the player can use the play guiding function of this musical instrument with ease.

Still another characteristic feature of the present invention lies in that the musical instrument of this type is further provided with an external inputting portion capable of inputting performance data representing a piece of music from outside; and a guide controlling portion for controlling the combination of operation of the play operators shown to the player by the play guiding device, in accordance with the performance data input from outside by the external inputting portion. In this case, the external inputting portion inputs performance data from various external music apparatus such as a sequencer, an electronic musical instrument, a personal computer, or inputs performance data from a server via a communication line such as the internet.

According to the characteristic feature of the present invention thus constructed, the player can easily obtain performance data representing various music via the external inputting portion and can let the play guiding device show the player a combination of the play operators that should be operated by the player on the basis of the input performance data. Therefore, the player can easily enjoy playing various music and can easily practice playing various music.

BRIEF DESCRIPTION OF THE DRAWINGS

FIG. 5 is a fingering view showing a relationship between tone pitch and fingering;

FIG. 6A is a partial view illustrating a play piston section according to a modification of the aforesaid embodiment;

FIG. 6B is a partial view illustrating a play piston section according to a modification of the aforesaid embodiment;

DESCRIPTION OF THE PREFERRED EMBODIMENTS

Figure 1:
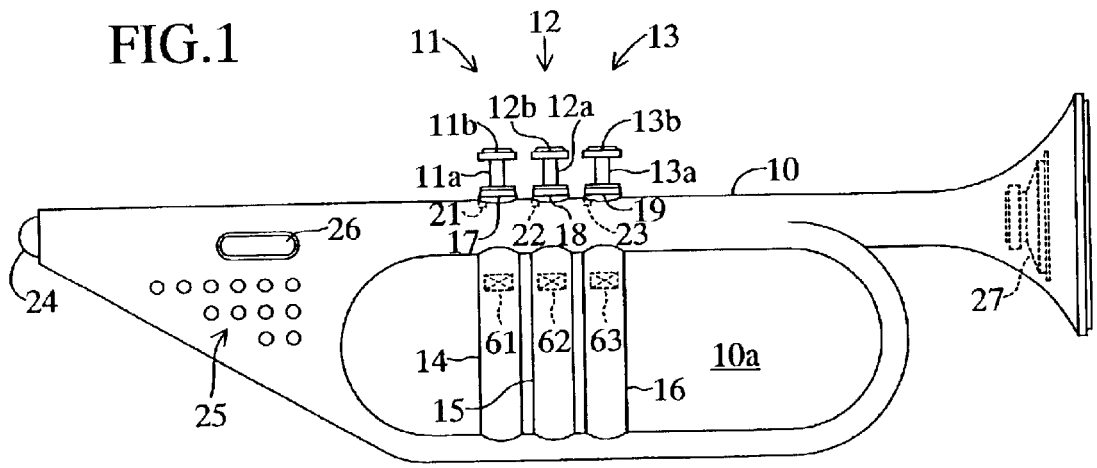
FIG. 1 is a schematic side view illustrating an outlook of a musical instrument according to one embodiment of the present invention.

Hereafter, one embodiment of the present invention will be described with reference to the attached drawings. FIG. 1 is a schematic side view illustrating an outlook of a musical instrument according to the present invention.

This musical instrument includes a housing 10 that imitates a shape of a trumpet. Housing 10 has a hollow inside, is elongated in the front-and-back direction (corresponding to the right-and-left direction in FIG. 1), and has a large elliptic central hole 10a that can allow a hand to pass therethrough. At the upper central part in the front-and-back direction of housing 10, a first play piston 11, a second play piston 12, and a third play piston 13 are incorporated in this order in the direction from the front side to the tip end side in the front-and-back direction.

Figure 2:
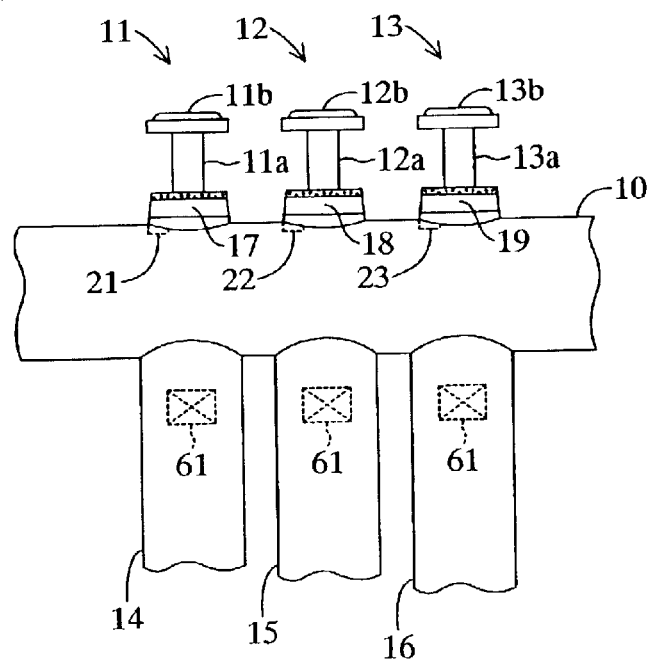
FIG. 2 is a partial enlarged view of FIG. 1, illustrating play pistons and grips in enlargement.

Referring to FIGS. 1 and 2, these first to third play pistons 11 to 13 respectively include rods 11a to 13a extended in the up-and-down direction and disk-shaped operating sections 11b to 13b that are fixed on the upper end of rods 11a to 13a for being pressed and operated by a finger. Rods 11a to 13a pass through an upper part of housing 10 to penetrate into three cylindrical grips 14 to 16, respectively, in a proceedable and recedable manner. Grips 14 to 16 are vertically disposed in central hole 10a of housing 10, so as to connect their two ends to the upper and lower part of housing 10. The lower end parts of rods 11a to 13a are each urged upwards by a spring and stopper mechanism (not illustrated) disposed in grips 14 to 16 when disk-shaped operating sections 11b to 13b are pressed downwards, and come to a standstill at the illustrated upper end position when the downward pressing is released.

At the penetration inlets of rods 11a to 13a into housing 10, rings 17 to 19 are respectively fixed to the upper surface of housing 10. Under these rings 17 to 19, light-emitting elements 21 to 23 constructed with a light-emitting diode, a lamp, or the like are incorporated in housing 10 so as to confront with rings 17 to 19, respectively. The upper part of each of rings 17 to 19 is formed with a translucent resin, and the lower part of each of rings 17 to 19 is formed with a transparent resin. This prevents the light emitted by energization of light-emitting elements 21 to 23 from leaking through the upper surface of rings 17 to 19, so that the whole rings 17 to 19 may emit light, each independently. Each of Rings 17 to 19 has also a function as a stopping member that restricts each downward displacement of first to third play pistons 11 to 13 by the upper surface thereof.

At the end surface on the front side of housing 10, an air vibration sensor 24 such as a microphone or a piezoelectric element bonded to a thin plate is incorporated. On one side surface on the front side of housing 10, a plurality of setting operators 25 for instructing an operation mode of this musical instrument and a displayer 26 constructed with a liquid crystal display for displaying the operation mode are provided. In the inside on the tip end side of housing 10, a speaker 27 for generating musical tones is incorporated to face towards the tip end. Further, in the inside of housing 10, an electric circuit device (not illustrated) for controlling the operation of this musical instrument is housed.

Figure 3:
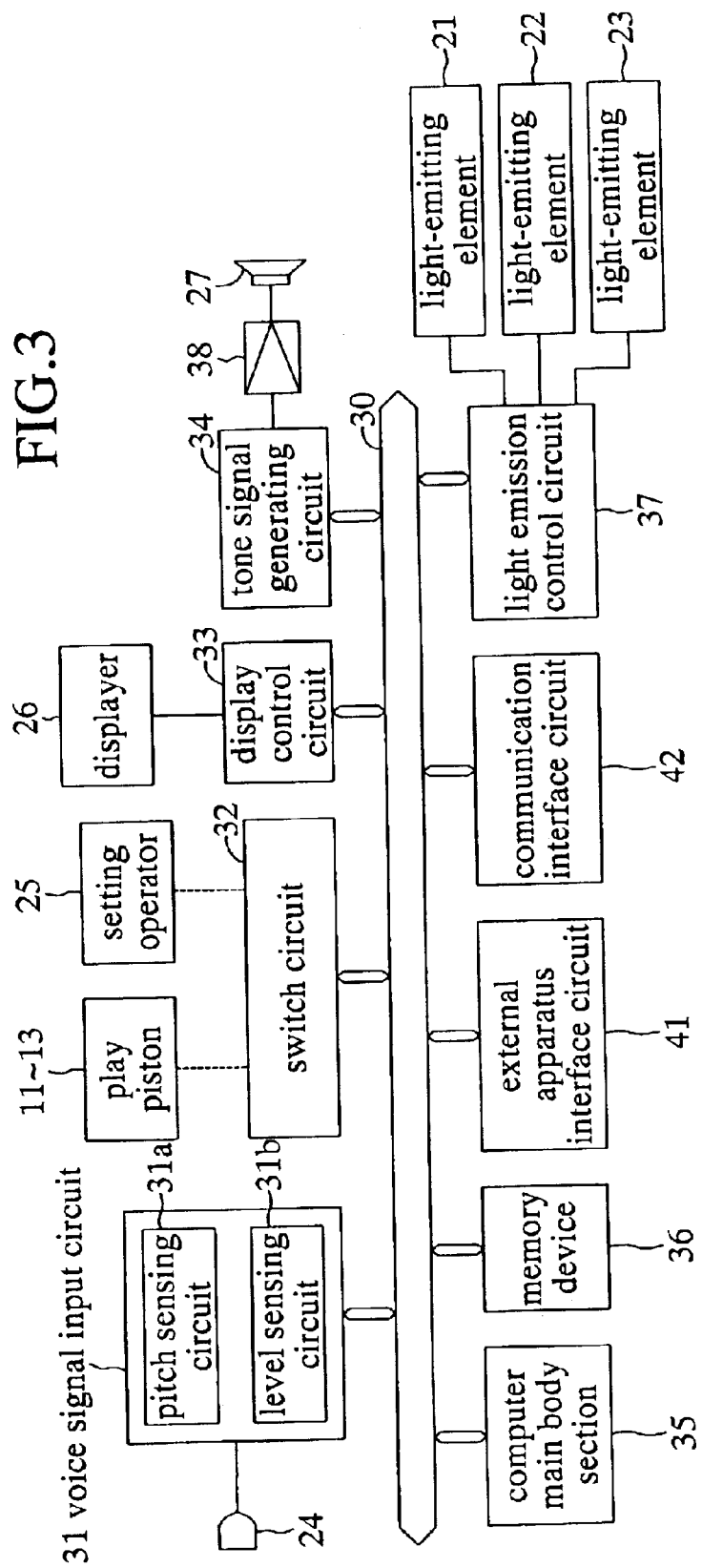
FIG. 3 is a block diagram of an electric circuit device incorporated in the musical instrument of FIG. 1.

Next, this electric circuit device will be described with reference to the block diagram of FIG. 3. The electric circuit device includes a voice signal input circuit 31, a switch circuit 32, a display control circuit 33, a tone signal generating circuit 34, a computer main body section 35, a memory device 36, and a light emission control circuit 37 that are connected to bus 30.

Voice signal input circuit 31 includes a pitch sensing circuit 31a for sensing the pitch (frequency) of a voice signal that is input from air vibration sensor 24, and a level sensing circuit 31b for sensing the tone volume level (amplitude envelope) of the voice signal. Switch circuit 32 has switches that are interlocked with an operation of first to third play pistons 11 to 13 and the plurality of setting operators 25, and senses the operation of first to third play pistons 11 to 13 and the plurality of setting operators 25. Display control circuit 33 controls the display state of displayer 26. Tone signal generating circuit 34 generates tone signals on the basis of tone pitch data, key-on data, and key-off data that are input, and outputs the tone signals to speaker 27 via an amplifier 38. Here, the tone pitch data represent the frequency (pitch) of the generated musical tone, while the key-on data and key-off data represent the start and end of the generation of musical tone, respectively.

Computer main body section 35 is composed of a CPU, a ROM, a RAM, a timer, and others, and controls various operations of this musical instrument by execution of a program. Memory device 36 is composed of a recording medium having a small size and a large capacity, such as a memory card, and stores various programs and various performance data. These performance data constitute automatic performance data of music that store tone pitch data, key-on data, key-off data, and others in time series. Light emission control circuit 37 controls energization of light-emitting elements 21 to 23.

Further, an external apparatus interface circuit 41 and a communication interface circuit 42 are connected to bus 30. External apparatus interface circuit 41 communicates with various external music apparatus connected to a connection terminal (not illustrated) so as to enable output and input of various programs and data to and from various external music apparatus. Communication interface circuit 42 communicates with outside via a communication network (for example, the internet) connected to a connection terminal (not illustrated) so as to enable output and input of various programs and data to and from outside (for example, a server).

Before starting the description of specific operations of the musical instrument thus constructed, brief description of a method of playing this musical instrument will be given hereafter. A player holds the musical instrument by gripping the grips 14 to 16 with one hand, and operates to press the first to third play pistons 11 to 13 so as to designate the tone pitch of the musical tones to be generated with the fingers of the other hand. However, in this musical instrument, though the tone pitch of the generated musical tone is designated by a combination of a non-operated state and an operated state of first to third play pistons 11 to 13 in the same manner as in a trumpet or the like, the designated tone pitch in this case is not one, so that a plurality of tone pitch candidates are simultaneously designated.

Then, in a state in which the first to third play pistons 11 to 13 are operated as described above, the player generates a voice having a frequency that is close to the pitch (the frequency) of the musical tone that the player wishes to generate, towards the air vibration sensor 24. The voice in this case may be, for example, a simple one such as "ah" or "uuh" and, in essence, it is sufficient that the voice has a specific frequency. By the generation of this voice, the tone pitch having the closest frequency to the frequency of the aforesaid voice is determined, as a tone pitch of the generated musical tone, from among the plurality of tone pitch candidates designated by the aforesaid operation of first to third play pistons 11 to 13. Then, a musical tone (for example, a trumpet sound) having the aforesaid determined tone pitch is generated in synchronization with the voice.

Figure 5:
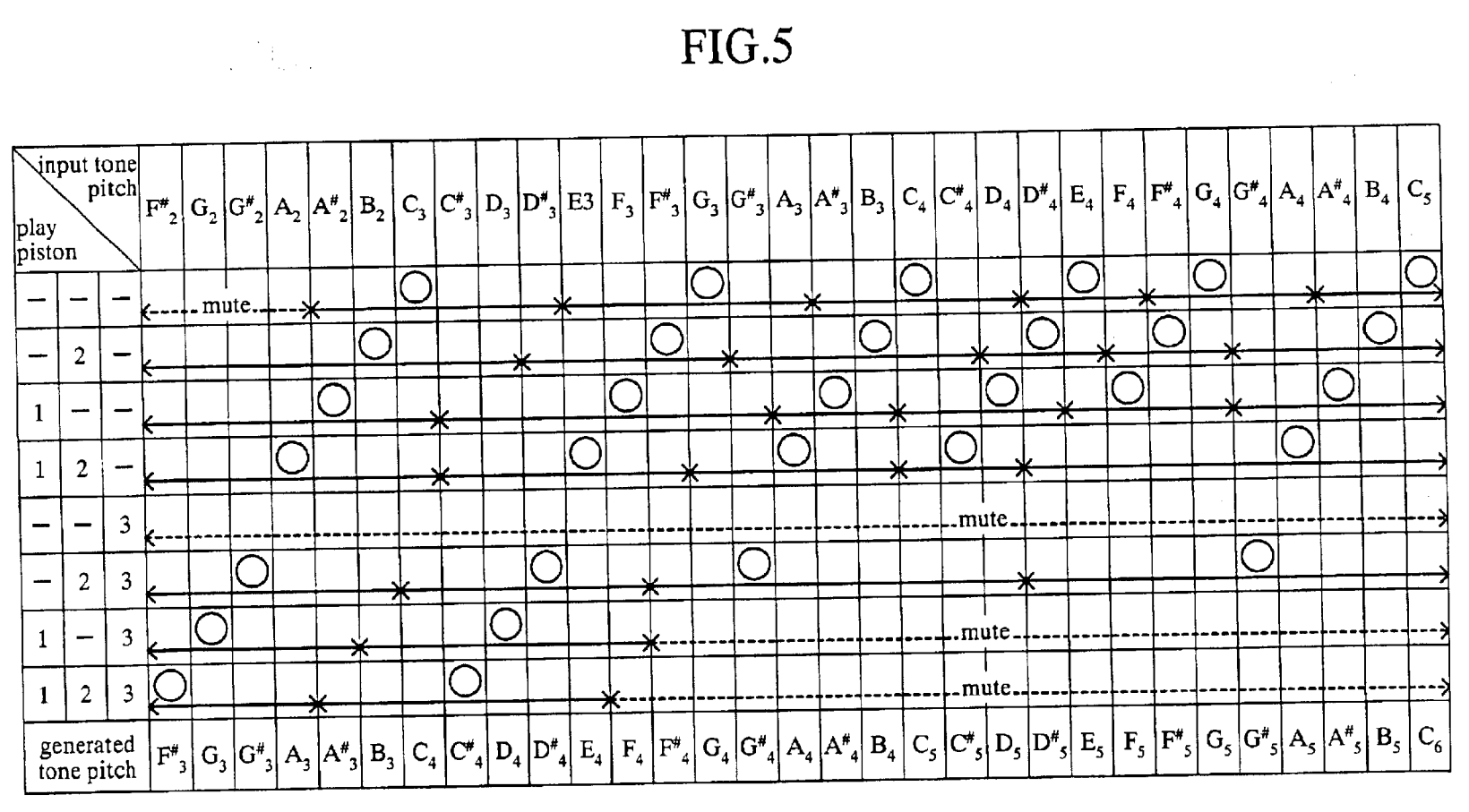

The designation of this tone pitch will be described with reference to FIG. 5. The left column captioned with "play piston" in FIG. 5 displays eight combinations of operation of first to third play pistons 11 to 13 composed of the non-operated state and the operated state of first to third play pistons 11 to 13 in the vertical direction. In this case, numerals "1", "2", and "3" denote play pistons that should be operated, in respective correspondence with first, second, and third play pistons 11 to 13, and the symbol "–" denotes a play piston that should not be operated. On the other hand, the bottom row captioned with "generated tone pitch" in FIG. 5 displays the tone names of the musical tones to be generated, in the lateral direction. Further, the symbol "○" at an intersection above the "generated tone pitch" and to the right of "play piston" provides correspondence between the tone pitch of the musical tone to be generated and the combination of first to third play pistons 11 to 13 that should be operated. Therefore, by a combination of operation of first to third play pistons 11 to 13, a plurality of tone pitches are designated as tone pitch candidates of the musical tone to be generated. For example, if none of first to third play pistons 11 to 13 are operated, the tone pitch candidates of the musical tone to be generated will be "C4", "G4", "E5", and others. If only the second play piston 12 is operated, the tone pitch candidates of the musical tone to be generated will be "B3", "F#4", "B4", "D#5", and others.

Further, an arrow below the symbol "○" in FIG. 5 displays a allowance range of the shifts of the frequency to the generated musical tone of the voice signal that is input from air vibration sensor 24. This allowance range corresponds to the frequencies of the tone names displayed in the lateral direction in the top row captioned with "input tone pitch" in FIG. 5. Here, the tone names of the "generated tone pitch" in the bottom row in FIG. 5 are shifted from the tone names of the "input tone FIG. 5 by one octave in order to compensate for the shift of the generated tone pitch range of a trumpet from the frequency range of a human voice (male). Further, the denotation "mute" in FIG. 5 means that no musical tones are generated. Therefore, if for example a voice in a frequency range between "A#2" and "D#3" is input in a state in which none of the first to third play pistons 11 to 13 are operated, a musical tone having a tone pitch of "C4" is generated, while if a voice in a frequency range between "E3" and "A3" is generated in a state in which none of the first to third play pistons 11 to 13 are operated, a musical tone having a tone pitch of "G4" is generated. Here, the allowance ranges of the shift of the frequency of the voice signal can be changed in various ways by an operation of setting operator 25.

Figure 4:
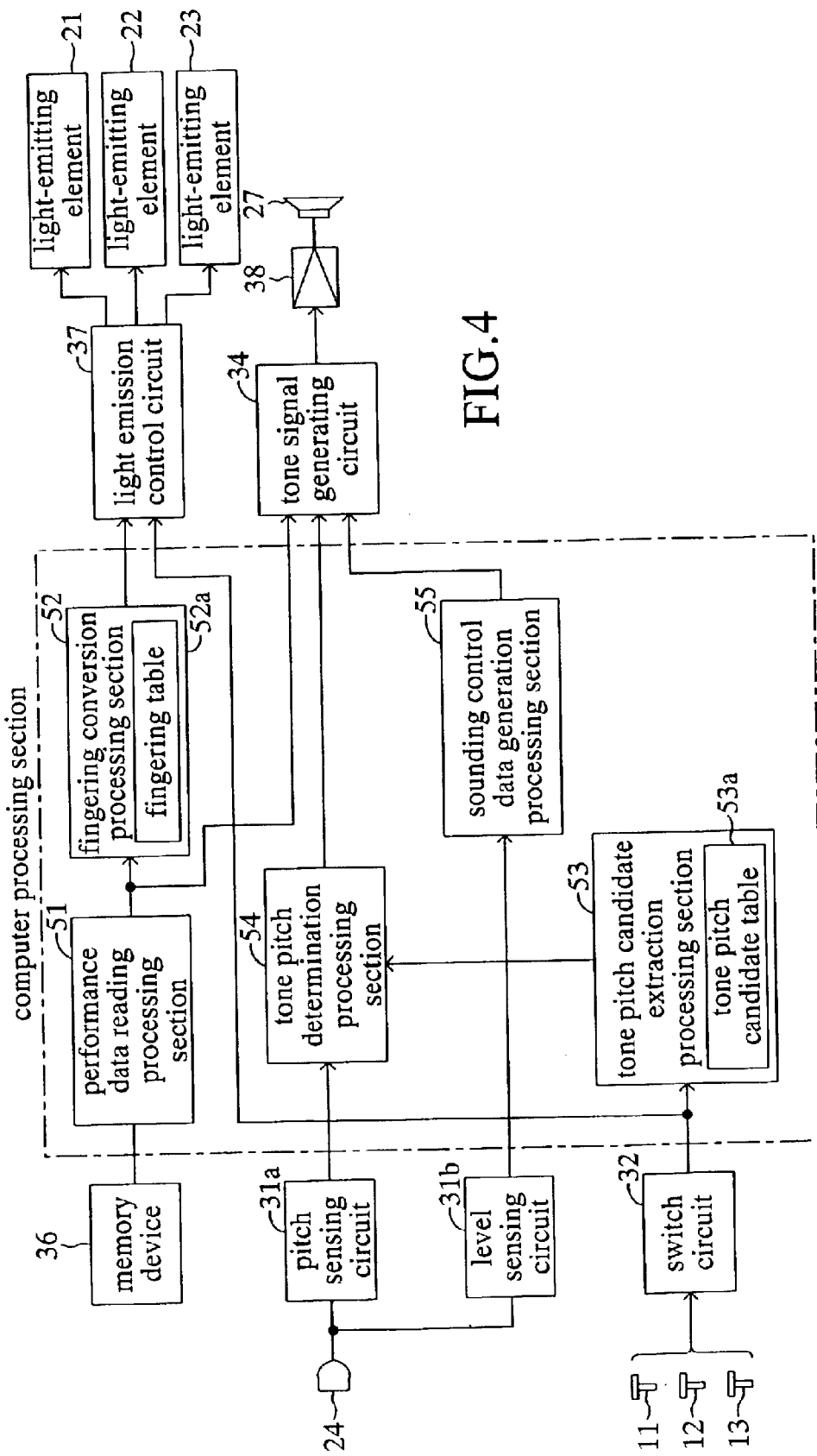
FIG. 4 is a functional block diagram functionally illustrating a program executed in the computer main body section of FIG. 3.

Next, specific operations of the musical instrument constructed in the above-mentioned manner will be described with reference to the functional block diagram of FIG. 4. Here, the computer processing section in this functional block diagram functionally represents a program process of computer main body section 35. First, description will be given on a play guiding mode operation that shows the player a combination of operation of first to third play pistons 11 to 13 that should be operated, on the basis of the performance data stored in memory device 36. In this case, the performance data may be those stored in advance in memory device 36 or those obtained from outside music apparatus via external apparatus interface circuit 41, or those obtained from an outside server via communication interface circuit 42 and a communication network.

By execution of a program of computer main body section 35, performance data reading processing section 51 reads tone pitch data, key-on data, key-off data, and others out from memory device 36 sequentially in accordance with the passage of time (progression of music). The read-out tone pitch data are converted into fingering data representing a combination of play pistons 11 to 13 that the player should operate, in fingering conversion processing section 52. In this conversion process of the fingering data, reference is made to a fingering table stored in advance in the ROM of computer main body section 35 or in memory device 36.

The fingering table stores data showing a relationship between the tone pitches of the musical tones that should be generated and the combinations of first to third play pistons 11 to 13 that should be operated, in a form of a table. Namely, for each tone name in the "generated tone pitch" row of FIG. 5, the fingering table stores data representing a combination of operation of first to third play pistons 11 to 13 in the same row as the symbol "○" in the column of the tone name, as the fingering data. For example, if the tone pitches of the musical tones that should be generated (the tone pitch represented by the tone pitch data) are "F#3" and "G3", the combinations of first to third play pistons 11 to 13 that should be operated are "operation of first to third play pistons 11 to 13" and "operation of first and third play pistons 11, 13 while keeping second play piston 12 in the non-operated state", respectively.

Fingering conversion processing section 52 supplies the aforesaid converted fingering data to light emission control circuit 37. Light emission control circuit 37 controls energization of light-emitting elements 21 to 23 on the basis of the supplied fingering data. Therefore, the first to third play pistons 11 to 13 that should be operated in order to generate a musical tone having a tone pitch corresponding to the tone pitch data that are read out by performance data reading processing section 51 are shown to the player by light emission of rings 17 to 19 through energization of light-emitting elements 21 to 23.

By such light emission of rings 17 to 19 for showing, the player can recognize a combination of first to third play pistons 11 to 13 that should be operated, so that even a player who has not mastered playing this type of musical instrument can easily enjoy playing this type of musical instrument and can easily practice on the musical instrument. Further, through the process of fingering conversion processing section 52, a combination of the plurality of play operators that the player should operate is determined by simply inputting tone pitch data representing a tone pitch, so that the play guide is realized without preparing special data. Therefore, the player can use the play guide function of this musical instrument with ease. Furthermore, as the aforesaid tone pitch data, performance data can be input from various outside music apparatus, or performance data can be input from a server or the like via a communication line such as the internet, so that the player can easily enjoy playing various music and can easily practice playing various music.

In addition, the tone pitch data, key-on data, key-off data, and others that have been read out by the aforesaid performance data reading processing section 51 are simultaneously supplied to tone signal generating circuit 34 as well. On the basis of these tone pitch data, key-on data, key-off data, and others, tone signal generating circuit 34 generates a tone signal having a tone pitch corresponding to the tone pitch data (for example, a tone signal of a trumpet tone color). This tone signal is then sounded out from speaker 27 via amplifier 38, so that the music corresponding to the aforesaid performance data read out from memory device 36 is automatically performed. This allows that the player can listen to model playing by automatic performance as well.

Next, description will be given on a case in which the player presses and operates first to third play pistons 11 to 13 on the basis of the aforesaid play guide and inputs a voice into air vibration sensor 24 to generate a played musical tone. In this case, the state of operation of first to third play pistons 11 to 13 by the player is sensed by switch circuit 32, and is supplied to a tone pitch candidate extraction processing section 53. Tone pitch candidate extraction processing section 53 extracts tone pitch candidates in accordance with the combination of first to third play pistons 11 to 13 that are operated by the player. In this process of extracting the tone pitch candidates, reference is made to tone pitch candidate table 53a that is stored in advance in the ROM of computer main body section 35 or in memory device 36.

Tone pitch candidate table 53a stores data representing a relationship between combinations of operation of first to third play pistons 11 to 13 and the tone pitches of the musical tones that may possibly be generated, in a form of a table. Namely, for each combination of operation of first to third play pistons 11 to 13 in the "play piston" column of FIG. 5, the fingering table stores data representing the plurality of tone names in the "input tone pitch" row corresponding to the symbols "◯" in the row that shows the combination, as tone pitch candidate data.

Therefore, tone pitch candidate extraction processing section 53 extracts the plurality of tone pitches (plurality of tone pitches shown in the "input tone pitch" row) corresponding to the symbols "◯" in the row designated by the combination of operation of first to third play pistons 11 to 13, as tone pitch candidates. Then, the data representing the tone pitch candidates are supplied to tone pitch determination processing section 54.

Tone pitch determination processing section 54 inputs voice pitch data representing the pitch (frequency) of the voice of the player that is sensed by a pitch sensing circuit 31a in addition to the aforesaid tone pitch candidate data, and determines the tone pitch of the musical tone to be generated on the basis of both the tone pitch candidate data and the voice pitch data. In this determination of the tone pitch, a frequency range that the frequency of the voice signal belongs is determined in consideration of an allowance range set on both sides of the frequency that corresponds to each of the tone pitches represented by the plurality of tone pitch candidate data (corresponding to the aforesaid range shown by an arrow below each symbol "◯" in FIG. 5). Then, from among the plurality of tone pitches respectively represented by the aforesaid plurality of tone pitch candidate data, the tone pitch belonging to the aforesaid determined frequency range is eventually determined as the tone pitch for the musical tone to be generated, and is output to tone signal generating circuit 34. Therefore, if for example a voice in the frequency range between "A#2" and "D#3" is input in a state in which none of the first to third play pistons 11 to 13 are operated, the tone pitch data representing the tone pitch of "C4" are supplied to tone signal generating circuit 34, while if a voice in the frequency range between "E3" and "A3" is input in a state in which none of the first to third play pistons 11 to 13 are operated, the tone pitch data representing the tone pitch of "G4" are supplied to tone signal generating circuit 34.

On the other hand, a sounding control data generation processing section 55 inputs a tone volume level (amplitude envelope) of the input voice signal that is sensed by level sensing circuit 31b. Then, sounding control data generation processing section 55 forms key-on data and key-off data on the basis of this tone volume level, and supplies the data to tone signal generating circuit 34. Specifically, the key-on data are formed when the aforesaid sensed tone volume level reaches a predetermined level or above, and the key-off data are formed when the tone volume level falls below the predetermined level. On the basis of these supplied tone pitch data, key-on data, and key-off data, tone signal generating circuit 34 generates a tone signal having a tone pitch represented by the tone pitch data (for example, a tone signal of a trumpet tone color), and sounds out a musical tone corresponding to the tone signal via amplifier 38 and speaker 27. Therefore, the sounds played by the player are generated simultaneously with the play guide, and can be compared with the above-described automatic performance sounds.

Further, the aforesaid data sensed by switch circuit 32 and representing the state of operation of first to third play pistons 11 to 13 are also supplied to light emission control circuit 37. Light emission control circuit 37 controls energization of light-emitting elements 21 to 23 on the basis of the supplied data, so as to allow light emission of rings 17 to 19 corresponding to first to third play pistons 11 to 13 that are operated by the player.

This control means energization of light-emitting elements 21 to 23 by the operation of first to third play pistons 11 to 13 by the player in addition to energization by the performance data stored in memory device 36. Therefore, if the player operates first to third play pistons 11 to 13 correctly in accordance with the play guide, the state of energization of light-emitting elements 21 to 23 remain unchanged. However, if the player does not operate first to third play pistons 11 to 13 correctly in accordance with the play guide, the state of energization of light-emitting elements 21 to 23 undergoes change. By this change in the state of light emission of rings 17 to 19 accompanying the change in the energization state, the player can recognize mistakes of playing the musical instrument also visually.

Further, by providing a last priority circuit in light emission control circuit 37 or by a last priority process in the computer processing section, only the data that are output later among the data output from fingering conversion processing section 52 and the data output from switch circuit 32 may be supplied to light emission control circuit 37. This construction as well allows the player to recognize mistakes of playing the musical instrument by the difference between the energization state of light-emitting elements 21 to 23 by the data output from fingering conversion processing section 52 and the energization state of light-emitting elements 21 to 23 by the data output from switch circuit 32.

As shown above, in the description of the operation of the musical instrument according to the present embodiment, the energization control of light-emitting elements 21 to 23 based on performance data, the generation of musical tones based on the performance data, the generation of musical tones by the player's playing of the musical instrument, and the energization control of light-emitting elements 21 to 23 by the player's playing of the musical instrument are all carried out simultaneously. However, by changing the mode setting of setting operator 25, any one or more kinds of control among the aforesaid four kinds of control may be selectively cancelled.

Further, in carrying out the present invention, it is not limited to the aforesaid embodiments or modified examples thereof, so that various modifications can be made as long as they do not depart from the object of the present invention. For example, referring to FIG. 6(A), numerous small reflecting bodies, air bubbles 17a, or the like that reflect light may be mixed into the resin that constitutes ring 17 corresponding to first play piston 11 and, by allowing random reflection of light from light-emitting element 21, it may be made to appear as if the whole ring 17 is emitting light. Also, referring to FIG. 6(B), a plurality of light-emitting elements 21 may be disposed under ring 17. This Ring 17 also a function as a stopper to restrict the downward displacement of first play piston 11 when the lower surface of disk-shaped operating section 11b hits against the upper surface of ring 17 by depressing disk-shaped operating section 11b. Here, these modified examples can also be applied to rings 18, 19 that correspond to second and third play pistons 12, 13.

Figure 7A:
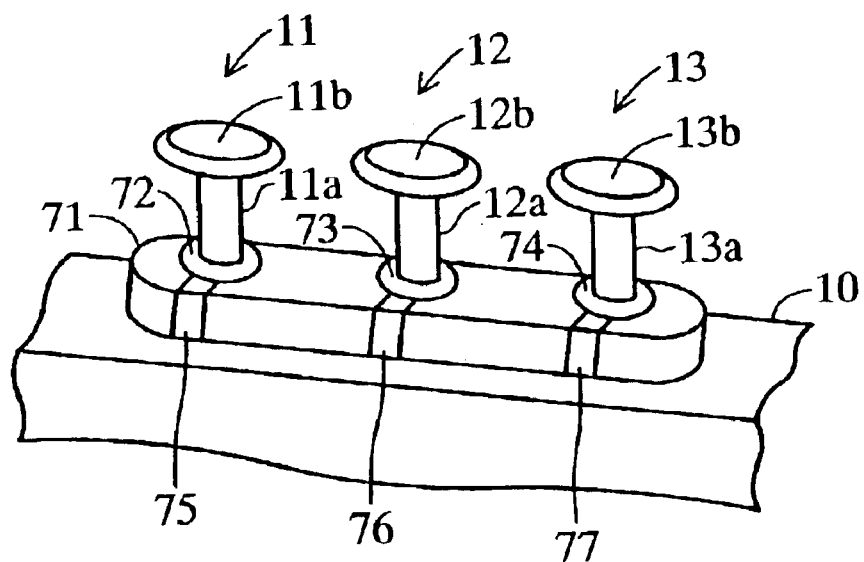
FIG. 7A is a partial perspective view illustrating a play piston section according to a modification of the aforesaid embodiment.
Figure 7B:
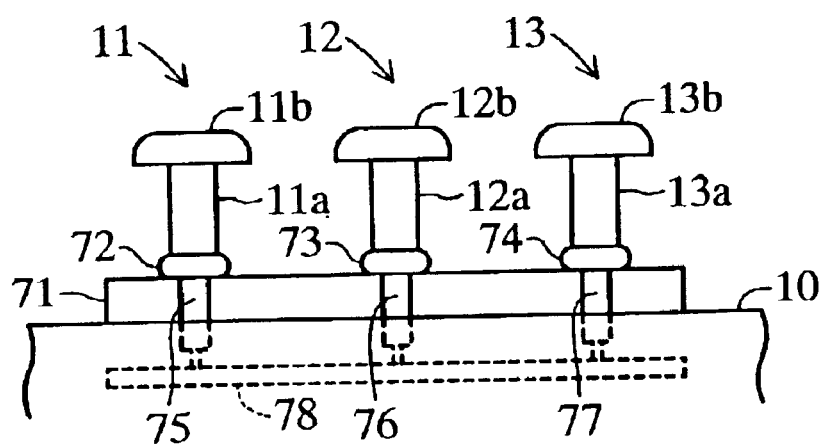
FIG. 7B is a side view of the play piston section shown in FIG. 7A.

Furthermore, referring to FIG. 7(A) and FIG. 7(B), the upper surface of housing 10 might be formed so as to have a flat portion and piston base plate 71 might be fixed to on the flat portion commonly to first to third play pistons 11 to 13. Piston base plate 71 is oblong and has proper thickness (for example, thickness of 1.0–10.0 mm). Rods 11a to 13a pass through the holes of piston base plate 71 to penetrate into housing 10 in a proceedable and recedable manner as described in the above embodiment. Rings 72 to 74 are fixed to the upper surface of piston base plate 71 about rods 11a to 13a to function as stoppers to restrict the downward displacement of first to third play pistons 11 to 13 by hitting of the lower surfaces of disk-shaped operating section 11b to 13b thereto.

Light emitting elements 75 to 77 such as light-emitting diodes are embedded in the slits formed adjacent to rings 72 to 74 respectively on the right side (corresponding to lower side in FIG. 7A) of piston base plate 71. The top surfaces and upper side surfaces of light emitting elements 75–77 appear on the outer surface of piston base plate 71. The electric lead lines of light emitting elements 75–77 are fixed to electric print board 78 incorporated in housing 10 and are electrically connected to the electric circuit devices disposed on electric print board 78.

Here, in this modification, Light emitting elements 75 to 77 as light emitting elements may be embedded in the slits formed adjacent to rings 72 to 74 respectively on the left side or both sides of piston base plate 71. According to these modifications, the manufacturing cost for this musical instrument becomes low, since light emitting elements 75 to 77 are fixed to electric print board 78 directly and commonly.

Furthermore, the colors of energized light-emitting elements 21 to 23 corresponding to first to third play pistons 11 to 13 may be made different from each other. In the above described embodiments, rings 17 to 19 located close to first to third play pistons 11 to 13 are let to emit light; however, first to third play pistons 11 to 13 themselves may be let to emit light. In this case, at least one of rods 11a to 13a and operation sections 11b to 13b of first to third play pistons 11 to 13 may be constructed with a transparent or translucent resin, and the light from light-emitting elements 21 to 23 may be guided into the resin.

Further, according to the above-described embodiments and modified examples thereof, the play pistons to be operated among first to third play pistons 11 to 13 are visually displayed by energization of light-emitting elements 21 to 23. However, instead of this or in addition to this, the play pistons to be operated may be a little displaced upwards or downwards, or the play pistons may be vibrated so as to give play guide such that the play pistons to be operated may be recognized by the player through his skin sensation. In this case, as shown by broken lines in FIGS. 1 and 2, driving devices 61 to 63 such as a small electromagnetic actuator, or a small piezoelectric actuator that drive first to third play pistons 11 to 13 may be incorporated respectively in grips 14 to 16 and, instead of or in addition to light emission control circuit 37, a driving control circuit may be disposed that controls driving of the aforesaid driving devices on the basis of the data representing the play pistons to be operated.

Further, in the aforesaid embodiments, first to third play pistons 11 to 13 are adopted as play operators; however, instead of these first to third play pistons 11 to 13, various play operators may be used that are constructed with simple operation switches or touch switches for determining the tone pitch of the generated musical tone. Furthermore, as to the number of play operators also, a suitable integer of two or more can be adopted. In essence, the present invention can be applied to various musical instruments that determine the tone pitch of a generated musical tone in accordance with a combination of operation of a plurality of play operators.

Further, instead of air vibration sensor 24 in the aforesaid embodiments, a bone conduction pick-up device that senses vibration by being allowed to touch the "throat" of a human body may be used so that the frequency of this sensed vibration of the "throat" may be sensed, and the sensed frequency may be introduced into tone pitch determination processing section 54 by a program process of computer main body section 35 so as to be used for a tone pitch determination process performed by tone pitch determination processing section 54. This allows that even those who cannot generate voices such as those having bad vocal cords can play a mouth air stream type musical instrument such as in the above-described embodiments.

Further, as to the outer shape of the musical instrument and the tone color of the generated musical tone also, the present invention is also applied to electronic musical instruments that imitate the musical instruments shape of other wind instruments such as a horn or the shape of other natural musical instruments and generate the musical tone having a tone color of these musical instruments. In addition, the present invention can be applied also to musical instruments other than those that generate musical tones electrically.

What is claimed is:

1. A musical instrument comprising:

a plurality of play operators operated by fingers of a player;

a detector for detecting voice information output by the player;

a tone pitch determination section for determining a tone pitch of a generated musical tone in accordance with a combination of operation of the plurality of play operators and the detected voice information; and a play guiding device for guiding a player to proceed to play by a method such that the player in a playing state can perceive, said play guiding device showing the player a combination of the plurality of play operators that should be operated by the player.

2. The musical instrument according to claim 1, wherein said play guiding device shows the player the play operators that should be operated, by light emission of said plurality of play operators themselves or by light emission of a neighborhood of each of said plurality of play operators.

3. The musical instrument according to claim 1, wherein said plurality of play operators are displaced by operation of the player, and said play guiding device comprises a plurality of light emitting elements disposed in the neighborhood of the plurality of play operators respectively.

4. A musical instrument comprising:

a plurality of play operators determining a tone pitch of a generated musical tone in accordance with a combination of operation of the plurality of play operators, said plurality of play operators being displaced by operation of a player; and a play guiding device for guiding a player to proceed to play by a method such that the player in a playing state can perceive, said play guiding device showing the player a combination of the plurality of play operators that should be operated by the player, wherein said play guiding device comprises a plurality of light emitting elements disposed in the neighborhood of the plurality of play operators respectively, and wherein each of said plurality of light emitting elements functions as a stopper against each downward displacement of said plurality of play operators.

5. A musical instrument comprising:

a plurality of play operators for determining a tone pitch of a generated musical tone in accordance with a combination of operation of the plurality of play operators, said plurality of play operators being displaced by operation of a player;

a play guiding device for guiding a player to proceed to play by a method such that the player in a playing state can perceive, said play guiding device showing the player a combination of the plurality of play operators that should be operated by the player; and a plurality of stopping members for restricting the displacement of said plurality of play operators respectively, wherein said play guiding device comprises a plurality of light emitting elements disposed in the neighborhood of the plurality of play operators respectively.

6. The musical instrument according to claim 3, further including a plate disposed in the neighborhood of said plurality of play operators, said plate embedding said plurality of light emitting elements.

7. The musical instruments according to claim 1, wherein said play guiding device shows the player the play operators that should be operated, by displacement of said plurality of play operators.

8. The musical instrument according to claim 1, having an outer shape of a wind instrument.

9. The musical instrument according to claim 1, further including:

a converting portion for inputting tone pitch data representing a tone pitch and for converting the input tone pitch data into combination data representing a combination of operation of the plurality of play operators corresponding to the tone pitch represented by the tone pitch data; and a guide controlling portion for controlling the combination of operation of the play operators shown to the player by said guiding device, in accordance with the combination data converted by said converting portion.

10. The musical instrument according to claim 1, further including:

an external inputting portion capable of inputting performance data representing a piece of music from outside; and a guide controlling portion for controlling the combination of operation of the play operators shown to the player by said play guiding device, in accordance with the performance data input from outside by said external inputting portion.

11. The musical instrument according to claim 1, wherein said detector detects a frequency of the voice output by the player.

* * * * *